United States Patent [19]

Cottam

[11] Patent Number: 4,865,140
[45] Date of Patent: Sep. 12, 1989

[54] ROBOTIC CRAWLING DEVICE

[76] Inventor: Spencer D. Cottam, 11254 Florinda Rd., San Diego, Calif. 92128

[21] Appl. No.: 224,369
[22] PCT Filed: May 19, 1986
[86] PCT No.: PCT/US86/01102
§ 371 Date: Jan. 15, 1988
§ 102(e) Date: Jan. 15, 1988
[87] PCT Pub. No.: WO87/07227
PCT Pub. Date: Dec. 3, 1987
[51] Int. Cl.$^4$ .............................. B62D 57/02
[52] U.S. Cl. ................................ 180/8.5; 180/8.6; 180/901
[58] Field of Search ............ 180/8.1, 8.5, 8.6, 901, 180/164; 114/222; 15/236

[56] References Cited

U.S. PATENT DOCUMENTS

| 3,777,834 | 12/1973 | Hiraoka et al. | 180/901 |
| 4,029,164 | 6/1977 | Urakami | 180/901 |
| 4,330,865 | 5/1982 | Hyde et al. | 180/8.5 X |
| 4,333,259 | 6/1982 | Pin-Huang | 180/901 |
| 4,345,658 | 8/1982 | Danel et al. | 180/8.5 |

FOREIGN PATENT DOCUMENTS 462761 5/1975 U.S.S.R. ................ 180/8.5

Primary Examiner—John A. Pekar
Attorney, Agent, or Firm—Pravel, Gambrell, Hewitt, Kimball & Krieger

[57] ABSTRACT

A robotic crawling device that can traverse vertical and overhead surfaces while carrying other equipment. The device preferably includes a platform (10) that remains a substantially fixed distance from the surface. The platform (10) rides on a crawling mechanism which includes an outer housing (56) and an inner housing (46) positioned within the outer housing (56). A turning mechanism can be mounted with the inner housing (46) to allow the device to be advanced in any direction.

20 Claims, 5 Drawing Sheets

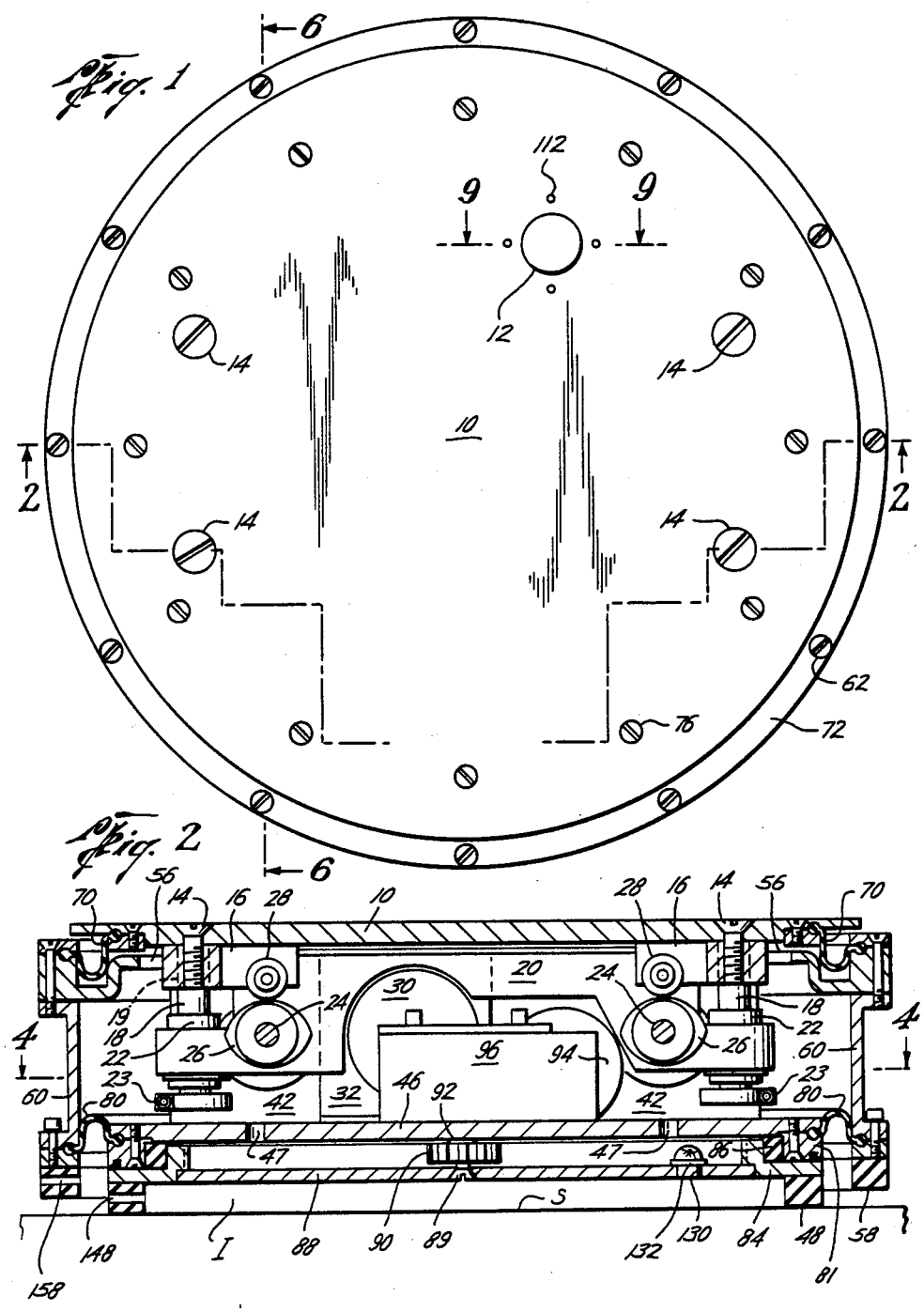

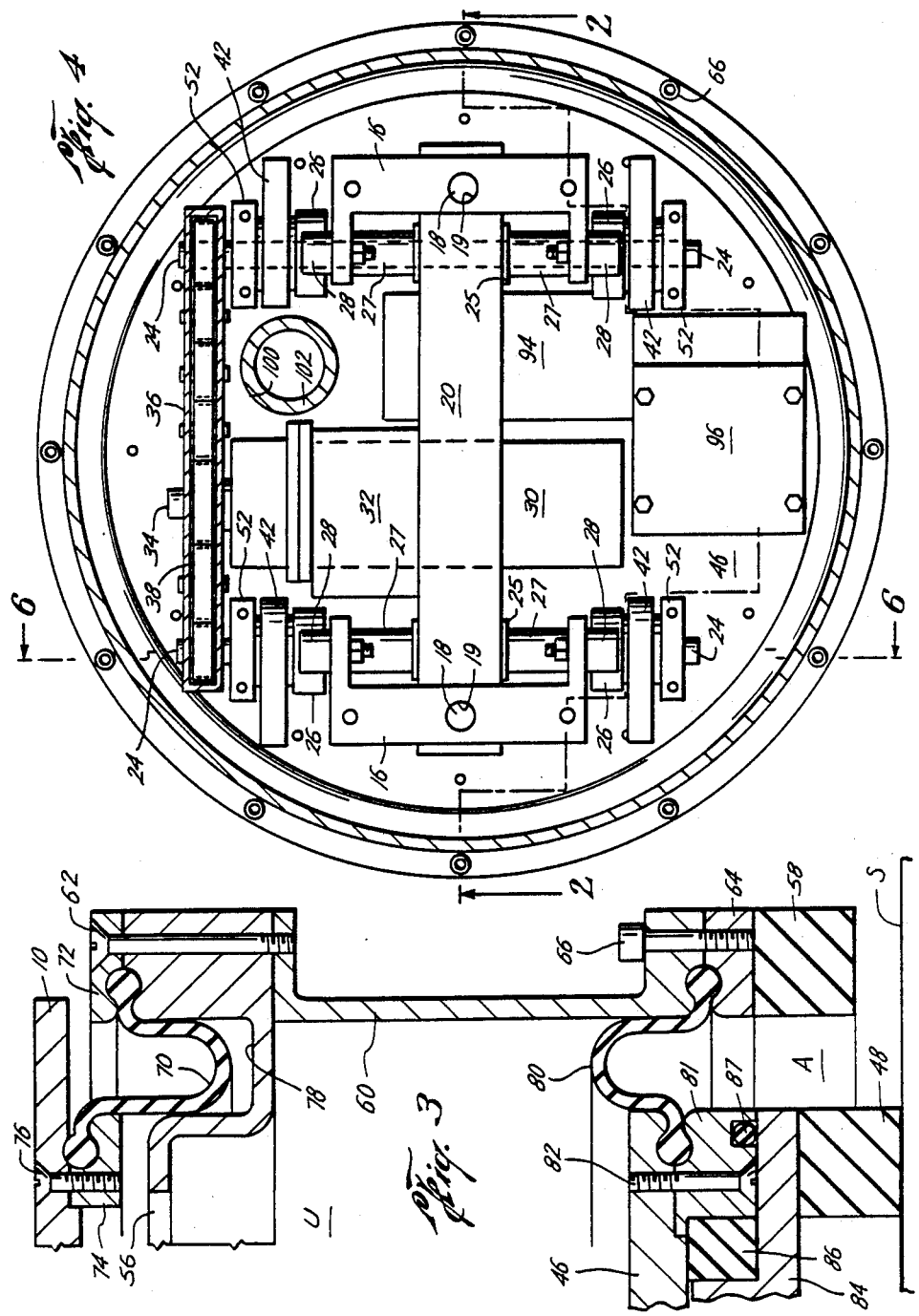

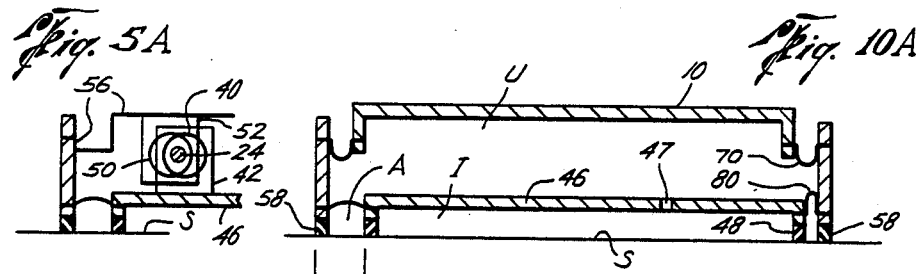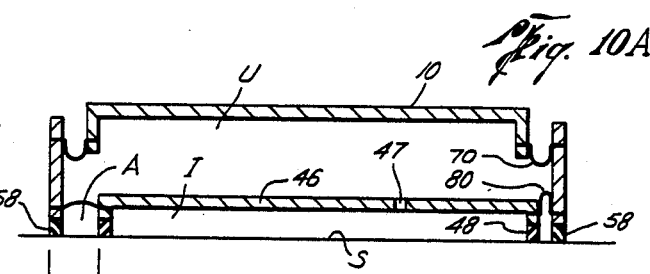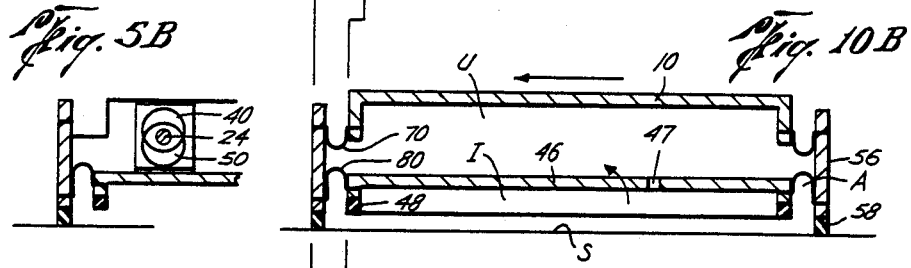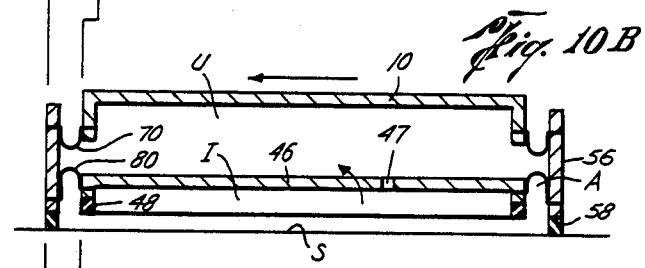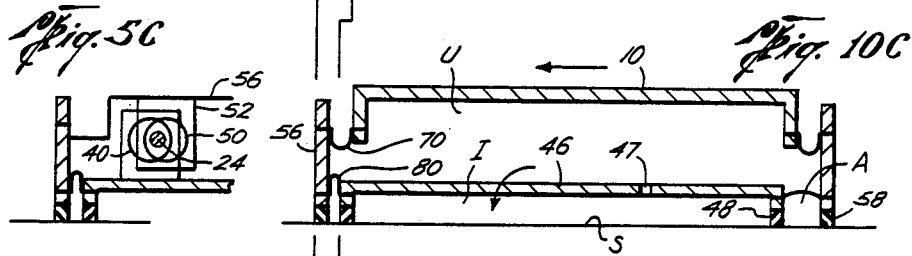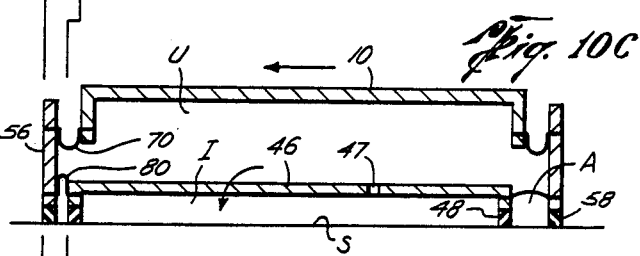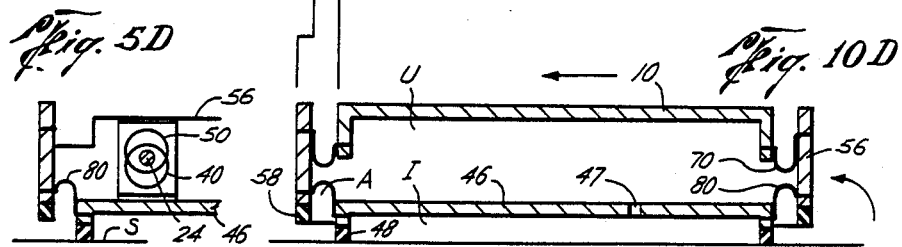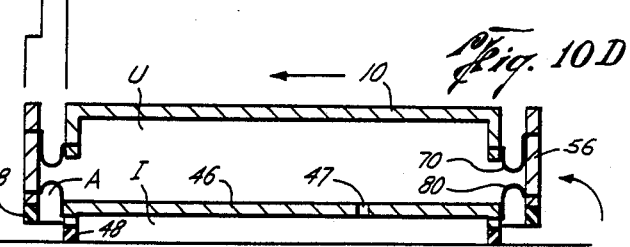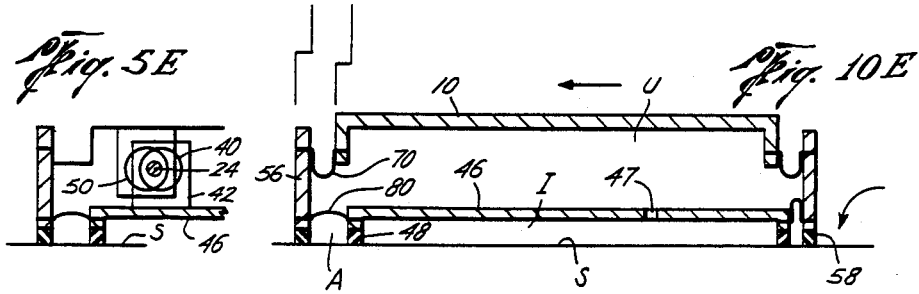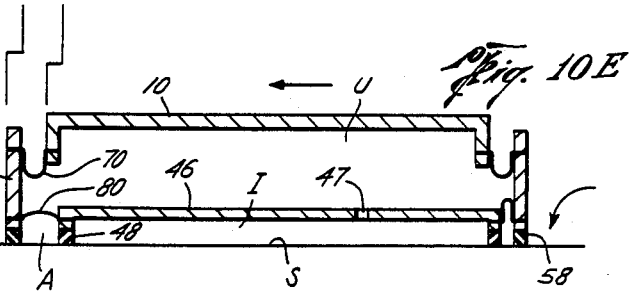

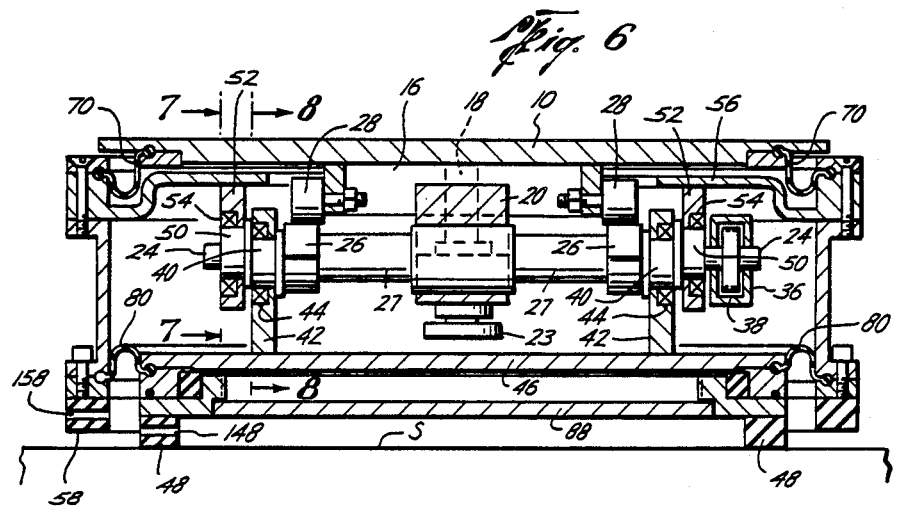
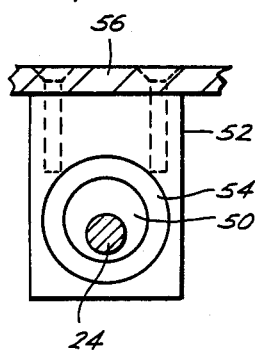
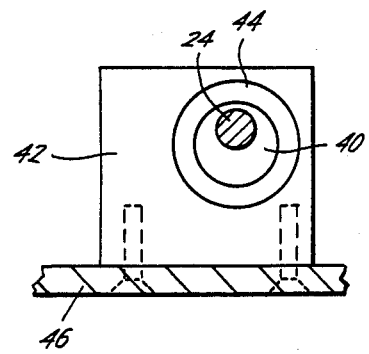

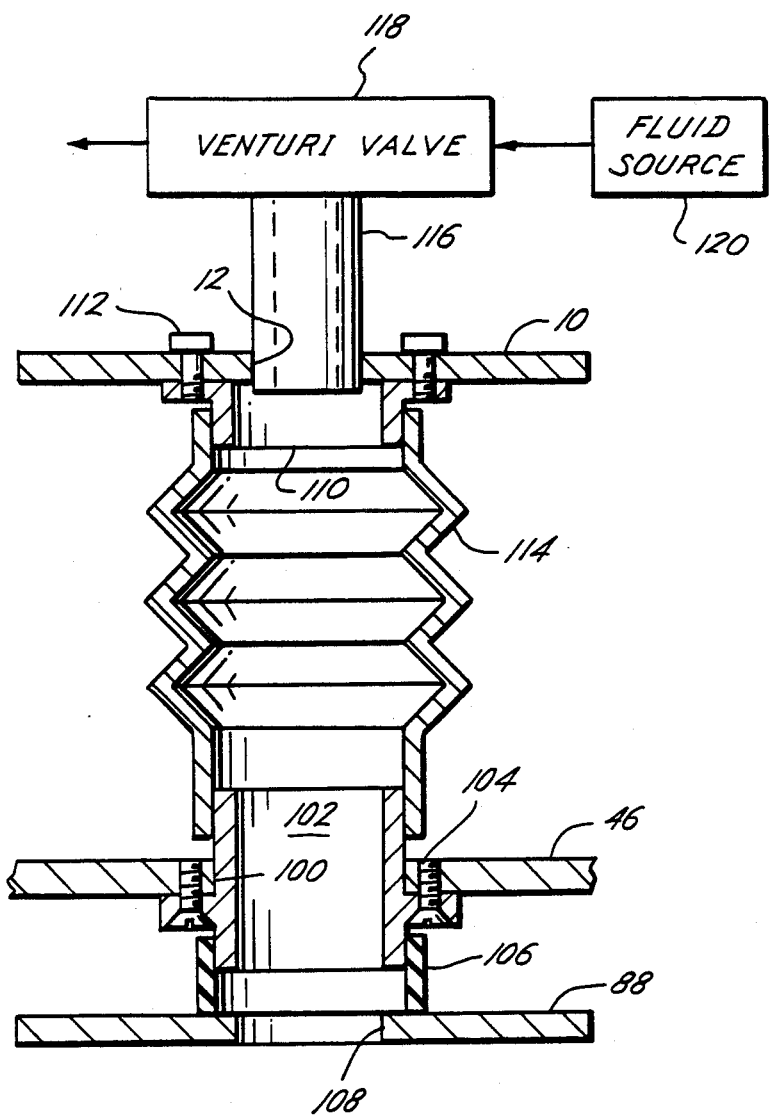

4,865,140

ROBOTIC CRAWLING DEVICE

FIELD OF THE INVENTION

This invention relates generally to robotic devices for accessing vertical and overhead surfaces. More specifically, the invention relates to such robotic devices that can carry other equipment such as surface cleaning devices.

BACKGROUND OF THE INVENTION

Many industrial activities require access to surfaces that can not be easily accessed by workers. For example, large storage tanks and ships require occasional surfacing cleaning and are difficult to access without costly scaffolding or lift devices. Furthermore, some surfaces such as walls and ceilings within storage tanks and nuclear reactors require elaborate and costly safety precautions for access by workers.

Remote controlled robots are replacing workers in a number of industrial activities and thus reducing the risk of injury or death to the work force. A robot that could carry equipment across a wide variety of vertical and overhead surfaces could be used for many industrial activities such as surface cleaning.

SUMMARY OF THE INVENTION

The robotic crawling device of the present invention can traverse vertical and overhead surfaces and comprises outer gripping means for gripping the surface, inner gripping means for gripping the surface, the inner gripping means being positioned within the outer gripping means, and crawling means for raising, advancing, and lowering the outer and inner gripping means in sequence.

In a preferred embodiment, the robotic crawling device further comprises a platform for mounting other devices. The platform is mounted to the crawling device such that the platform remains a substantially fixed distance from the surface.

Another aspect of the preferred embodiment is the use of suction to grip the surface by maintaining a low pressure between the surface and the platform. Alternatively, the crawling device can be adapted to grip metal surfaces with electromagnets. Further, the crawling device can include a turning mechanism for changing the direction of movement across the surface.

BRIEF DESCRIPTION OF THE DRAWINGS

FIG. 1 is a top view of a preferred embodiment of the robotic crawling device of the present invention, the preferred embodiment using suction to grip the surface and having a platform for mounting other devices and a turning mechanism;

FIG. 2 is a sectional view of the robotic crawling device of FIG. 1 as indicated by line 2—2 on FIG. 1;

FIG. 3 is an enlarged view of the right end of FIG. 2;

FIG. 4 is a top view of the robotic crawling device of FIG. 1 with the platform removed as shown by line 4—4 on FIG. 2;

FIGS. 5A, 5B, 5C, 5D, and 5E present schematic representations of the crawling motion for the robotic crawling device of FIG. 1;

FIG. 6 is a sectional view of the robotic crawling device of FIG. 1 as indicated by line 6—6 on FIG. 1 and better shows the details of a preferred crawling mechanism;

FIGS. 7 and 8 are detailed views of components of the preferred crawling mechanism of FIG. 6;

FIG. 9 is a sectional view of a preferred mechanism for maintaining low pressure within the crawling device; and FIGS. 10A, 10B, 10C, 10D, and 10E present further schematic representations of the preferred crawling motion which correspond to FIGS. 5A, 5B, 5C, 5D, and 5E, respectively.

DETAILED DESCRIPTION OF A PREFERRED EMBODIMENT

In the drawings, a platform 10 is provided for mounting other devices thereon (not shown), such as Applicant's surface cleaning device which is described in U.S. Pat. No. 4,531,253 and is hereby incorporated by reference. The attachment of the cleaning device or other equipment to the platform 10 may be by any conventional means such as bolts, or by welding. The platform 10 is capable of traversing horizontal and vertical surfaces, including overhead surfaces, while the platform 10 remains a substantially fixed distance from the surface S as described below. The platform 10 adheres to the surface S by suction and is connected to a suction source as described below. A hole 12 in the platform 10 is provided for connection with the suction source.

The use of suction to hold the platform 10 to the surface S allows use of the device with a variety of surfaces such as concrete or steel. When the device is used predominantly on one type of surface, other mechanisms for holding the platform to the surface S can be used such as electromagnets (not shown) for gripping steel as further mentioned below.

Referring to FIG. 2, the platform 10 is fastened by screws 14 or other fastening means to mounting blocks 16. The mounting blocks 16 mount vertical shafts 18 which are pressed into holes 19 in the mounting blocks 16. A mounting frame 20 slidably engages the vertical shafts 18 using linear bearings 22. Movement of the mounting frame 20 on the vertical shafts 18 is preferably limited by clamps 23 fastened to the free ends (lower ends as viewed in FIG. 2) of the vertical shafts 18.

Cam shafts 24 are rotatably mounted in bearings 25 (FIG. 4) with the mounting frame 20. Football-shaped cams 26 are fixed to the cam shafts 24 using keyways and set screws or other fastening means (not shown). The football-shaped cams 26 are spaced from the mounting frame 20 by spacer sleeves 27 mounted on the shafts 24 on each side of the bearings 25 (FIG. 6). The football-shaped cams 26 engage rollers 28 (FIG. 2) that are mounted with the mounting blocks 16. The cam shafts 24 are rotated by a drive motor 30 (FIGS. 2 and 4) which is mounted to the mounting frame 20 by a motor support 32. The drive motor 30 has a drive shaft 34 (FIG. 4) that is in driving connection with the cam shafts 24 through a drive gearbox 36. The gearbox 36 has a central chamber 38 that holds a plurality of gears that transfer power from the drive shaft 34 to the cam shafts 24.

As will be explained, when the platform 10 adheres to the surface S by suction, the rollers 28 ride upon the rotating football-shaped cams 26. As explained below, the football-shaped cams 26 and cam shafts 24 move toward and away from the surface S (FIG. 2), but the shape of the football-shaped cams 26 causes the rollers 28 and the platform 10 to remain a substantially fixed distance from the surface.

Referring to FIGS. 6, 7 and 8, inner circular cams 40 (FIG. 8) are eccentrically mounted to the cam shafts 24 outside the football cams 26 by keyways and set screws or other fastening means (not shown). The inner circular cams 40 are rotatably mounted in bearings 44 within inner support brackets 42. The inner support brackets 42 are attached by screws or other fastening means (not shown) to an inner housing 46. The inner housing 46 preferably includes a turning mechanism as described below. With the turning mechanism, the inner housing 46 is indirectly connected to an inner annular seal 48 which engages the surface S when the inner housing 46 is pressed against the surface S as described below.

Outer circular cams 50 (FIG. 7) are eccentrically mounted to the cam shafts 24 outside the inner circular cams 40 using keyways and set screws or other fastening means (not shown). The outer cams 50 are similar to the inner cams 40 except that the outer cams 50 are offset on the shafts 24, 180 degrees with respect to the inner cams 40 when fixed to the cam shafts 24 (compare FIGS. 7 and 8). The outer cams 50 are rotatably mounted in bearings 54 within outer support brackets 52. The outer support brackets 52 are fastened by screws or other fastening means (not shown) to an outer housing 56 (FIG. 6).

Referring to FIG. 3, the outer housing 56 is connected to an outer annular seal 58 which engages the surface S when the outer housing 56 is pressed against the surface S, as described below. The outer housing 56 is connected to a housing body 60 by screws 62 or other fastening means. The housing body 60 is connected to a housing body retaining ring 64 by screws 66 or other fastening means. The function of the retaining ring 64 is described in more detail below. The outer annular seal 58 is fixed to the retaining ring 64 by glue or other suitable known fastening means. Alternatively, the outer seal 58 can be fixed to a removable ring (not shown) which can be fastened to the retaining ring 64 by screws or other fastening means for easy replacement of the outer seal 58.

An upper chamber U (FIGS. 3 and 5A) is formed within the outer housing 56 by connecting the outer housing 56 to the platform 10 and to the inner housing 46 by flexible annular diaphragms 70 and 80, respectively. A first flexible annular diaphragm 70 is connected to the outer housing 56 with an outer housing retaining ring 72 using screws 62, and is further connected to the platform 10 by a platform retaining ring 74 using screws 76 or other fastening means. An annular notch 78 in the outer housing 56 allows movement of the flexible annular diaphragm 70 as the outer housing 56 moves relative to the platform 10 as described below.

The outer housing body 60 and the outer housing retaining ring 64 hold a second flexible annular diaphragm 80 which is connected to the inner housing 46 by an inner housing retaining ring 81 using screws 82 or other fastening means. The second flexible annular diaphragm 80 splits the interior of the outer housing 56 into the upper chamber U, which is substantially disposed between the platform 10 and the inner housing 46, and an annular chamber A (see FIGS. 3 and 10A), which is substantially disposed between the inner annular seal 48 and the outer annular seal 58.

The preferred embodiment of the invention includes a turning mechanism as part of the inner housing 46. Referring to FIGS. 2 and 3, a ring gear 84 rotatably engages the inner housing 46 by sliding within a teflon ring bearing 86 which is mounted between the ring gear 84 and the inner retaining ring 81. The ring gear 84 is held in place by friction, and rotates within the inner housing retaining ring 81. An O-ring 87 (FIG. 3) is mounted between the retaining ring 81 and the ring gear 84 to minimize leakage for reasons that are more apparent below. The ring gear 84 is further retained by a cover plate 88 which is connected to the inner housing 46 by a screw 89 (FIG. 2) or other fastening means. A pinion gear 90 is rotatably mounted between the inner housing 46 and the cover plate 88 and engages the ring gear 84. The pinion gear 90 is fixed to a shaft 92 which is rotatably mounted on the inner housing 46. A conventional turning motor 94 and a turning gear box 96 are mounted on the inner housing 46 to rotate the pinion gear 90. Rotation of the pinion gear 90 causes the inner housing 46 to rotate relative to the ring gear 84 and is capable of changing the direction of travel or lateral movement of the inner housing 46 when the ring gear 84 is in contact with the surface through the inner annular seal 48. The inner seal 48 is fixed to the ring gear 84 by glue or other fastening means. Alternatively, the inner seal 48 can be fixed to a removable ring (not shown) which can be fastened to the ring gear 84 by screws or other fastening means for easy replacement of the inner seal 48.

An inner chamber I (FIGS. 2 and 10A) is formed by and contained within the inner housing 46 when the inner annular seal 48 is in contact with the surface S. The inner chamber I is in fluid communication with the upper chamber U, through holes 47 (FIG. 2) in the inner housing 46 if necessary, so that suction applied to either the inner chamber I or the upper chamber U reduces the pressure within both chambers. The inner chamber I and upper chamber U are not in fluid communication with the annular chamber A when the inner seal 48 is in contact with the surfaces (as shown in FIGS. 10A, 10C, 10D and 10E) although there may be some leakage therebetween, as explained below. All three chambers A, U, and I are in fluid communication when the inner seal 48 is raised from the surface (as shown in FIG. 10B).

Referring to FIG. 9, the source of suction is preferably in direct fluid communication with the inner chamber I. A hole 100 in the inner housing 46 mounts a hose fitting 102 which is secured to the inner housing 46 by screws 104 or other fastening means. A short tube 106 is connected to the hose fitting 102 between the inner housing 46 and the cover plate 88. The short tube 106 terminates above a hole 108 in the cover plate 88. A second hose fitting 110 is mounted in the hole 12 in the platform 10 using screws 112 or other fastening means. A flexible suction hose 114 is fastened between the first and second hose fittings 102 and 110 by clamps or other fastening means. Attachment of the suction source to the inner chamber I is preferred because water and other foreign substances on the surface S are drawn into the suction source without passing through the upper chamber U which contains most of the mechanical parts.

The suction source is preferably of a sufficient capacity to adhere the platform 10 to a porous surface such as concrete by lowering the pressure in the upper and inner chambers U and I relative to the pressure which is acting externally of the apparatus. The suction source must also lower the pressure in the annular chamber A each time the outer housing 56 is lowered to the surface S and the inner housing 46 is raised from the surface S. A suitable suction source is shown in FIG. 9. A short pipe 116 is threaded or otherwise fastened to the hole 12 in the platform 10 and mounts a venturi valve 118. The venturi valve 118 preferably has multiple venturi restrictions for creating suction within the pipe 116 when a fluid, such as air, from a fluid source 120, such as an air compressor, is passed through the venturi valve 118.

The suction source reduces the pressure within the suction hose 114 which reduces the pressure or creates a partial vacuum in the inner chamber I between the surface and the cover plate 88. A second hole 130 in the cover plate 88 helps to reduce the pressure between the cover plate 88 and the inner housing 46 so that the pressure is quickly reduced within the inner chamber I. A filter 132 is mounted over the hole 130 in the cover plate 88 to prevent particles from passing through the hole 130 when the source of suction is shut off.

When used on a porous surface, the inner annular seal 48 and the outer annular seal 58 will not prevent leakage. However, leakage around the seals 48 and 58 may assist in raising the inner housing 46 and the outer housing 56 by helping to equalize the pressure on both sides of each seal as it is raised. If the inner seal 48 and the outer seal 58 are used on a surface that does not allow sufficient leakage around the seals to the point that the seals are difficult to raise, compressible vents 148 and 158 (FIGS. 2 and 6) in the seals 48 and 58, respectively, provide adequate leakage. The compressible vents 148 and 158 are preferably small horizontal slots in the seals 48 and 58. The vents 148 and 158 are closed when the seals 48 and 58 are pressed against the surface as described below and opened to equalize the pressure on both sides of the seals as the force pressing against each seal is relieved as described below. Alternatively, the device can be provided with other mechanisms for equalizing the pressure on both sides of each seal 48 and 58.

In operation, the fluid source 120 and venturi valve 118 create a low pressure or partial vacuum in the pipe 116 which in turn creates a low pressure in the upper chamber U and the inner chamber I so that atmospheric pressure acts on the platform 10 to hold it or move it toward the surface S. The platform 10 pushes the cam shafts 24 toward the surface S through the rollers 28 and the football-shaped cams 26. The cam shafts 24 are positioned relative to the surface S by the inner housing 46 or the outer housing 56 through the inner cams 40 and the inner support brackets 42 or the outer cams 50 and the outer support brackets 52, respectively. As shown by FIGS. 5A-E and FIGS. 10A-E, rotation of the cam shafts 24 by the drive motor 30 causes the cam shafts 24 to shift the atmospheric force applied on the platform 10 between the inner housing 46 and the outer housing 56 as the inner cams 40 and the outer cams 50 sequentially raise and lower the inner housing 46 and the outer housing 56. The inner cams 40 and the outer cams 50 also advance the inner housing 46 and the outer housing 56, respectively, as each housing is raised and lowered. Thus, the inner housing 46 and the outer housing 56 move across the surface with a crawling motion whereby the housings 46 and 56 are sequentially raised, advanced, and lowered.

The crawling motion for the inner housing 46 and the outer housing 56 is schematically diagramed in FIGS. 5A, 5B, 5C, 5D, 5E, 10A, 10B, 10C, 10D, and 10E. In FIGS. 5A and 10A, both the inner annular seal 48 and the outer annular seal 58 are in contact with the surface S and a low pressure exists in the upper chamber U, the inner chamber I, and the annular chamber A. In this configuration, the outer housing 56 has been advanced to the left with respect to the inner housing 46 and the outer cams 50 and the inner cams 40 are in the relative positions shown in FIG. 5A.

In FIGS. 5B and 10B, the cam shafts 24 have been rotated ninety degrees (counterclockwise). The rotation of the cam shafts 24 causes the outer cams 50 and the inner cams 40 to rotate within the outer support brackets 52 and the inner support brackets 42, respectively. The outer support brackets 52 remain in a fixed position due to contact with the surface S and the counterclockwise rotation of the outer cams 50 and the inner cams 40 raises and advances the inner housing 46 and the inner annular seal 48 to the position shown in FIG. 10B. The movement of the inner cams 40 and the outer cams 50 raises the cam shafts 24 with respect to the surface S; however, the rotation of the football-shaped cams 26 by the cam shafts 24 allows the platform 10 to remain a substantially fixed distance from the surface S. The low pressure remains in the upper chamber U, the inner chamber I, and the annular chamber A for the position of the device shown in FIG. 10B.

In FIGS. 5C and 10C, the cam shafts 24 are further rotated ninety degrees (counterclockwise) from the position shown in FIG. 5B, which causes further rotation of the outer cams 50 and the inner cams 40 in the outer support brackets 52 and the inner support brackets 42, respectively. As the outer support brackets 52 remain in fixed positions due to contact with the surface S, the inner cams 40 and the inner annular seal 48 move to the left from the position shown in FIG. 5B to the position shown in FIG. 5C. The movement of the inner cams 40 lowers and advances the inner housing 46 until the inner annular seal 48 again contacts the surface S as shown in FIG. 10C. The movement of the inner cams 40 and the outer cams 50 lowers the cam shafts 24 with respect to the surface S; however, rotation of the football-shaped cams 26 by the cam shafts 24 causes the platform 10 to remain a substantially fixed distance from the surface S. The low pressure remains in the upper chamber U, the inner chamber I, and the annular chamber A.

In FIGS. 5D and 10D, the cam shafts 24 are further rotated ninety degrees (counterclockwise) from the position shown in FIG. 5C, causing further rotation of the outer cams 50 and the inner cams 40 within the outer support brackets 52 and the inner support brackets 42, respectively. The inner support brackets 42 remain in a fixed position due to contact with the surface S. The counterclockwise rotation of the inner cams 40 within the inner support brackets 42 causes the outer cams 50 to move from the position shown in FIG. 5C to the position shown in FIG. 5D. The movement of the outer cams 50 raises and advances the outer housing 56 and the outer annular ring 58 from the position shown in FIG. 10C to the position shown in FIG. 10D. The movement of the inner cams 40 and the outer cams 50 raises the cam shafts 24 with respect to the surface S; however, the rotation of the football-shaped cams 26 by the cam shafts 24 allows the platform 10 to remain a substantially fixed distance from the surface S. For the position of the device shown in FIGS. 5D and 10D, a low pressure remains in the upper chamber U and the inner chamber I although the raising of the outer annular seal 58 raises the pressure in the annular chamber A.

In FIGS. 5E and 10E, the cam shafts 24 are further rotated ninety degrees (counterclockwise) from the position shown in FIG. 5D, causing the outer cams 50 and the inner cams 40 to further rotate within the outer support brackets 52 and the inner support brackets 42, respectively. The inner support brackets 42 remain in a fixed position due to contact with the surface S. The counterclockwise rotation of the inner cams 40 moves the outer cams 50 from the position shown in FIG. 5D to the position shown in FIG. 5E which is the same as the starting position, FIG. 5A. The movement of the outer cams 50 lowers and advances the outer housing 56 until the outer annular seal 58 contacts the surface S. The movement of the inner cams 40 and the outer cams 50 lowers the cam shafts 24 with respect to the surface S; however, rotation of the football-shaped cams 26 by the cam shafts 24 causes the platform 10 to remain a substantially fixed distance from the surface S. For the position of the device shown in FIGS. 5E and 10E, the low pressure remains in the upper chamber U and the inner chamber I. A high pressure remains in the annular chamber A until rotation of the cam shafts 24 shifts the atmospheric force applied on the platform 10 from the inner annular seal 48 to the outer annular seal 58 and allows sufficient leakage between the inner annular seal 48 and the surface S for the suction source to reduce the pressure in the annular chamber A, thus returning the device to the configuration and condition described for FIGS. 5A and 10A.

While the robotic crawling device is advancing, if it is desired to change its direction of movement, a switch (not shown) to the turning motor 94 is turned on or activated so as to cause the motor 94 to change the direction of travel by rotating the inner housing 46 about the ring gear 84. When the desired direction is reached, the switch is turned off to deactivate the motor 94. The illustrated embodiment of the device will turn only while the inner annular seal 48 grips the surface S and the outer annular seal 58 is not gripping the surface S. A circuit control mechanism (not shown) for controlling the turning motor 94 can be used to prevent excessive wear on the turning motor 94 which might otherwise occur if the motor is operated when both the inner and outer seals 48 and 58 are gripping the surface S.

When used with a metal surface, the illustrated device can be easily converted from suction gripping to magnetic gripping by replacing the inner seal 48 and the outer seal 58 with inner and outer electromagnetic rings having substantially the same shape as the seals. The electromagnetic rings would then be sequentially energized to sequentially hold the cam shafts 24 to the surface through the inner housing 46 and the outer housing 56. Springs (not shown) could be mounted on the vertical shafts 18 between the mounting frame 20 and the clamps 23, or between the mounting frame 20 and the mounting blocks 16, to hold the rollers 28 against the football-shaped cams 26.

The foregoing disclosure and description of the invention are illustrative and explanatory thereof, and various changes in the size, shape and materials, as well as in the details of the illustrated construction may be made without departing from the spirit of the invention.

What is claimed is:

1. A robotic crawling device that can traverse a vertical or overhead surface, comprising:
   outer gripping means for gripping the surface;
   inner gripping means for gripping the surface, the inner gripping means being positioned within the outer gripping means; and
   crawling means for raising, advancing and lowering the outer gripping means as a unit and raising, advancing, and lowering the inner gripping means in sequence with the outer gripping means;
   wherein the outer gripping means circumscribes the inner gripping means.

2. The robotic crawling device of claim 1, further comprising turning means for changing the direction of the crawling means.

3. The robotic crawling device of claim 1, further comprising:
   a platform for mounting other devices therewith; and
   means for connecting the platform to the crawling means so that the platform remains a substantially fixed distance from the surface.

4. The robotic crawling device of claim 3, wherein the inner and outer gripping means comprises suction means for maintaining a low pressure between the surface and the platform.

5. The robotic crawling device of claim 1, wherein the inner and outer gripping means comprises electromagnets that sequentially grip the surface.

6. A robotic crawling device that can traverse a vertical or overhead surface, comprising:
   outer gripping means for gripping the surface;
   inner gripping means for gripping the surface, the inner gripping means being positioned within the outer gripping means;
   a cam shaft rotatably mounted to a mounting frame;
   a first circular cam eccentrically mounted on the cam shaft;
   first cam engaging means mounted with the outer gripping means and rotatably engaging the first cam;
   a second circular cam eccentrically mounted on the cam shaft;
   second cam engaging means mounted with the inner gripping means and rotatably engaging the second cam; and
   drive means mounted with the mounting frame for rotating the cam shaft for raising, advancing, and lowering the outer and inner gripping means in sequence.

7. A robotic crawling device that can traverse a vertical or overhead surface, comprising:
   an outer housing having first annular sealing means for sealing with the surface when pressed against the surface;
   an inner housing having second annular sealing means for sealing with the surface when pressed against the surface, the inner housing being positioned within the outer housing;
   suction means for pressing the inner and outer housings toward the surface;
   crawling means for raising, advancing, and lowering the outer and inner housings in sequence;
   a platform for mounting other devices therewith; and
   means for connecting the platform to the crawling means so that the platform remains a substantially fixed distance from the surface.

8. The robotic crawling device of claim 7, wherein the suction means comprises:
   an inner chamber within the inner housing;
   an annular chamber between the inner and outer housings;
   an upper chamber between the inner housing and the platform, the upper chamber being in fluid communication with the inner chamber; and
   a source of suction in fluid communication with the inner and upper chambers.

9. The robotic crawling device of claim 7, wherein the crawling means comprises:
a cam shaft rotatably mounted to a mounting frame;
a first circular cam eccentrically mounted on the cam shaft;
first cam engaging means mounted on the outer housing and rotatably engaging the first cam;
a second circular cam eccentrically mounted on the cam shaft;
second cam engaging means mounted with the inner housing and rotatably engaging the second cam; and
drive means mounted with the mounting frame for rotating the cam shaft.

10. The robotic crawling device of claim 9, further comprising turning means for changing the direction of advancing the inner and outer housings.

11. The robotic crawling device of claim 10, wherein the turning means comprises:
a pinion gear rotatably and eccentrically mounted with a first portion of the inner housing, the first portion of the inner housing including the second cam engaging means;
a ring gear mounted with a second portion of the inner housing and engaging the pinion gear, the second portion of the inner housing including the second annular sealing means;
connecting means for connecting the first and second portions of the inner housing to allow turning of the first portion with respect to the second portion; and
means for rotating the pinion gear.

12. The robotic crawling device of claim 7, further comprising venting means for equalizing the pressure around the first and second sealing means.

13. The robotic crawling device of claim 12, wherein the venting means comprises compressible vents in the first and second sealing means.

14. A robotic crawling device that can traverse a vertical or overhead surface, comprising:
an outer housing having first annular sealing means for sealing with the surface when pressed against the surface;
an inner housing positioned within the outer housing and having second annular sealing means for sealing with the surface when pressed against the surface, the inner housing forming an inner chamber;
a cam shaft rotatably mounted to a mounting frame;
a first circular cam eccentrically mounted on the cam shaft;
first cam engaging means mounted with the outer housing and rotatably engaging the first cam;
a second circular cam eccentrically mounted on the cam shaft;
second cam engaging means mounted with the inner housing and rotatably engaging the second cam;
drive means mounted with the mounting frame for rotating the cam shaft;
a platform for mounting other devices therewith;
means for connecting the platform to the cam shaft so that the platform remains a substantially fixed distance from the surface;
means for connecting the inner housing to the outer housing so that an annular chamber is formed between the inner and outer housings;
means for connecting the platform to the outer housing so that an upper chamber is formed within the outer housing, the upper chamber being in fluid communication with the inner chamber; and
a source of suction in fluid communication with the inner and upper chambers for maintaining a low pressure between the platform and the surface.

15. The robotic crawling device of claims 14, further comprising turning means for changing the direction of advancing the inner and outer housings.

16. The robotic crawling device of claim 15, wherein the turning means comprises:
a pinion gear rotatably and eccentrically mounted with a first portion of the inner housing, the first portion of the inner housing including the second cam engaging means;
a ring gear mounted with a second portion of the inner housing and engaging the pinion gear, the second portion of the inner housing including the second annular sealing means;
connecting means for connecting the first and second portions of the inner housing to allow turning of the first portion with respect to the second portion; and
means for rotating the pinion gear.

17. The robotic crawling device of claim 14, further comprising venting means for equalizing the pressure around the first and second sealing means.

18. The robotic crawling device of claim 17, wherein the venting means comprises compressible vents in the first and second sealing means.

19. The robotic crawling device of claim 14, wherein the means for connecting the platform to the cam shaft comprises:
a football-shaped cam mounted on the cam shaft;
a roller mounted with the platform and engaging the football-shaped cam; and
means for slidably connecting the platform to the mounting frame.

20. The robotic crawling device of claim 14, wherein the means for connecting the inner housing to the outer housing to form the annular chamber and the means for connecting the platform to the outer housing to form the upper chamber comprises flexible annular diaphragms.

* * * * *